(12) United States Patent
Golchikov et al.

(10) Patent No.: US 7,921,461 B1
(45) Date of Patent: Apr. 5, 2011

(54) SYSTEM AND METHOD FOR ROOTKIT DETECTION AND CURE

(75) Inventors: Andrey V. Golchikov, Moscow (RU); Andrey V. Sobko, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 1115 days.

(21) Appl. No.: 11/623,364

(22) Filed: Jan. 16, 2007

(51) Int. Cl.
*G06F 12/14* (2006.01)
*G06F 9/00* (2006.01)
*G08B 23/00* (2006.01)

(52) U.S. Cl. .................. 726/23; 726/24; 726/25; 713/2

(58) Field of Classification Search .............. 726/26, 726/23–25; 713/2
See application file for complete search history.

(56) References Cited

U.S. PATENT DOCUMENTS

| | | | |
|---|---|---|---|
| 5,613,002 A | | 3/1997 | Kephart et al. |
| 5,878,050 A | | 3/1999 | Brahme et al. |
| 5,995,982 A | | 11/1999 | Mercer |
| 6,021,491 A | | 2/2000 | Renaud |
| 6,735,696 B1 | * | 5/2004 | Hannah ............. 713/189 |
| 6,738,932 B1 | | 5/2004 | Price |
| 6,990,600 B2 | | 1/2006 | Ryan et al. |
| 7,631,357 B1 | * | 12/2009 | Stringham ............. 726/24 |
| 2001/0037323 A1 | * | 11/2001 | Moulton et al. .......... 707/1 |
| 2002/0010459 A1 | | 1/2002 | Whittier et al. |
| 2002/0174349 A1 | | 11/2002 | Wolff et al. |
| 2003/0115479 A1 | * | 6/2003 | Edwards et al. ........ 713/200 |
| 2004/0078729 A1 | * | 4/2004 | Peter .................. 714/54 |
| 2004/0181561 A1 | | 9/2004 | Knox et al. |
| 2005/0021994 A1 | | 1/2005 | Barton et al. |
| 2005/0278788 A1 | | 12/2005 | Jindal et al. |
| 2006/0031673 A1 | * | 2/2006 | Beck et al. ............. 713/164 |
| 2006/0053270 A1 | * | 3/2006 | Dunn et al. ............. 712/13 |
| 2006/0064687 A1 | * | 3/2006 | Dostert ................ 718/1 |
| 2007/0113062 A1 | * | 5/2007 | Osburn et al. ............ 713/1 |
| 2008/0034429 A1 | * | 2/2008 | Schneider ............. 726/23 |

OTHER PUBLICATIONS

Simon Baker et al, "Checking Microsoft Windows® Systems for Signs of Compromise", Oct. 28, 2005, version 1.3.4, pp. 1-18.*

* cited by examiner

*Primary Examiner* — Farid Homayounmehr
*Assistant Examiner* — Michael Guirguis
(74) *Attorney, Agent, or Firm* — Bardmesser Law Group (57) ABSTRACT

A system, method and computer program product for system for detecting a rootkit on a computer having an operating system, including a native application in ring 0 which, when the operating system is in a trusted state upon a reboot of the computer, after loading of the boot drivers but before loading of non-boot drivers, generates a first snapshot for selected files of the operating system and for a registry; the first snapshot being stored on a persistent storage medium of the computer; a second snapshot for the selected files and for the registry generated by the ordinary application after the loading of the non-boot drivers, generating; means for comparing the second snapshot with the first snapshot; and upon detecting, in the comparing step, one of a masked file and a masked registry branch, means for informing a user of possible rootkit presence on the computer.

23 Claims, 3 Drawing Sheets

SYSTEM AND METHOD FOR ROOTKIT DETECTION AND CURE

BACKGROUND OF THE INVENTION

1. Field of the Invention

The present invention relates to computer systems and, more specifically, to a system, method and computer program product for rootkit detection.

2. Background Art

A rootkit is a set of software tools frequently used by a third party (usually an intruder) after gaining access to a computer system intended to conceal running processes, files or system data, which helps an intruder maintain access to a system without the user's knowledge. Rootkits are known to exist for a variety of operating systems such as Linux, Solaris and versions of Microsoft Windows. A computer with a rootkit on it is referred to as a "rootkited" computer.

The term "rootkit" (also written as "root kit") originally referred to a set of recompiled Unix tools such as "ps," "netstat," "w" and "passwd" that would carefully hide any trace of the intruder that those commands would normally display, thus allowing the intruders to maintain "root" on the system without the system administrator even seeing them. Now the term is not generally restricted to Unix-based operating systems, as tools that perform a similar set of tasks now exist for non-Unix operating systems such as Microsoft Windows (even though such operating systems may not have a "root" account).

A rootkit typically hides logins, processes, threads, registry keys, files, and logs and may include software to intercept data from terminals, network connections, and the keyboard.

Rootkits come in three different "flavors": kernel, library and application level kits. Kernel level Rootkits add additional code and/or replace a portion of kernel code with modified code to help hide a backdoor on a computer system. This is often accomplished by adding a new code to the kernel via a device driver or loadable module, such as Loadable Kernel Modules in Linux or device drivers in Microsoft Windows. Library rootkits commonly patch, hook, or replace system calls with versions that hide information about the attacker. Application level rootkits may replace regular application binaries with trojanized fakes, or they may modify the behavior of existing applications using hooks, patches, injected code, or other means. Kernel rootkits can be especially dangerous because they can be difficult to detect without appropriate software.

Rootkits are usually written to the disk storage for activation after operating system restart and are hiddden from the operating system during requests to the file system. "Rootkits" are difficult to detect because they are activated before the operating system has completely booted up and often allows the installation of hidden files, processes and hidden user accounts in the systems OS. Rootkits are usually embedded in operating system processes in a filter-like manner, so that any regular detection means of the operating system cannot get information related to hidden software or software pieces.

One of the difficulties with detecting rootkits is due to the fact that, unlike viruses, rootkits typically activate themselves when the operating system is loaded upon start up of the computer, and rootkits usually acquire system privileges. Also, rootkits typically take steps to mask their existence, and prevent conventional antivirus detection mechanisms from identifying their existence. For example, a typical antivirus program invokes a system function call to identify the processes that are currently running. The rootkit intercepts the function call, and provides its own return parameters to the antivirus software, but masks its own process. Also, the rootkit typically hides the files in which it is stored from conventional antivirus mechanisms that check whether files contain known virus signatures. In other words, the files where the rootkit is stored are never actually checked by the antivirus software, which makes rootkits particularly difficult to detect and cure.

In the context of the Microsoft Windows operating system, a rootkit operates by intercepting the system function calls (so called Windows APIs). Interception and modification of the lower level API functions is the mechanism that rootkits use to mask their presence in the system. Furthermore, rootkits can often mask the presence, in the system, of any descriptions of the rootkit in the process configuration settings, files and folders, register keys, etc. Many rootkits install their own drivers and services into the system. The added drivers and services are also, obviously, masked. U.S. Pat. No. 7,032,114 describes a method of detecting a rootkit, where an initial sample is formed, after which the current sample of operating system is compared with the initial sample, in order to identify the presence of a rootkit.

U.S. Publication Application No. 2006/0168352 describes a conventional method of disinfecting a network node, where an initial snapshot is formed, and a subsequent snapshot, formed during the reboot process, is compared to the original snapshot.

U.S. Pat. No. 6,792,556 describes a conventional method of identifying a virus and computer recovery after being infected by a virus during the boot process, where a snapshot of the system state is saved to a file, and then, during the boot process, a current boot entry is generated, and a comparison of the current boot entry with the snapshot is performed. Based on the comparison, in the case of virus presence, the system is restored from the original snapshot. Furthermore, the snapshot can take a control sum into account.

However, most conventional methods cannot be used to detect the presence of a rootkit, due to its very nature. Furthermore, most of the conventional methods do not guarantee the detection of most rootkits that mask their existence, even where signature comparisons are used.

Accordingly, there is a need in the art for a system and method for a more effective detection and cure of rootkit infected computers.

SUMMARY OF THE INVENTION

The present invention relates to a detecting and curing rootkit, that substantially obviates one or more of the disadvantages of the conventional art.

In an exemplary embodiment of the present invention, there is provided a system, method and computer program product for system for detecting a rootkit on a computer having an operating system, the system including a native application in ring 0 which, when the operating system is in a trusted state upon a reboot of the computer, after loading of the boot drivers but before loading of non-boot drivers, generates a first snapshot for selected files of the operating system and for a registry; the first snapshot being stored on a persistent storage medium of the computer; a second snapshot for the selected files and for the registry generated by the user application at any time after the loading of the non-boot drivers; means for comparing the second snapshot with the first snapshot; and upon detecting, in the comparing step, one of a masked file and a masked registry branch, means for informing a user of possible rootkit presence on the computer. The selected files include system services. The system services are identified by a SERVICE_SYSTEM_START flag. The operating system is, in one embodiment, a WINDOWS operating system, and a 64 bit operating system or a 32 bit operating system. The boot drivers are identified by a SERVICE_BOOT_START flag. The snapshots are generated using a HKLM\SYSTEM\CurrentControlSet\Control\Session Manager\BootExecute key.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the embodiments of the present invention, examples of which are illustrated in the accompanying drawings.

As noted earlier, virtually all modern computers utilize operating systems to manage various functions of the computer. Currently, by far the most popular operating system has been the Microsoft Windows operating system, which exists in many versions, such as Windows NT 4.0, Windows 2000, Windows 2003, Windows XP (including 64 bit version), Windows Vista (including 64 bit version), Windows CE, Xbox OS, etc. The present invention is intended for use in at least all of the current and future anticipated versions of MS Windows, although on of ordinary skill in the art will readily appreciate how the ideas described herein can be applicable to other operating systems as well.

The Windows operating system is vulnerable to rootkit infection, as described earlier. In order to address the problem of detection of the rootkit, the following approach is proposed.

Snapshot creation generally involves sector by sector copying of the whole file system, i.e., service information and data. If the file system is currently active, then files may be modified during copying; some files can be open for writing or locked, for example. In the simplest case, file system operations can be suspended for some period of time and during that time a snapshot is recorded. Of course, such an approach cannot be applied to servers where uninterrupted activity of the file system is necessary.

Figure 1:
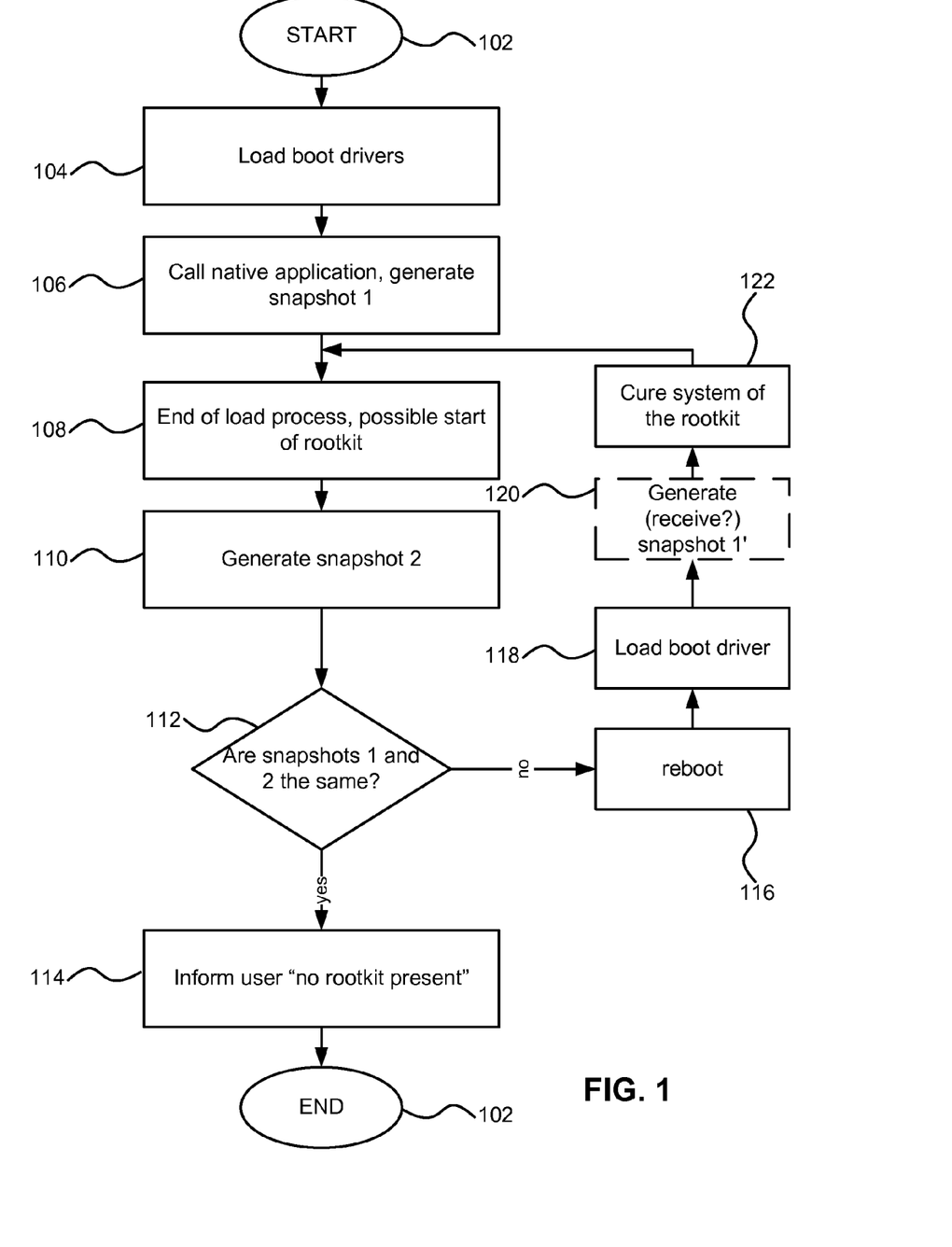
FIG. 1 illustrates, in flowchart form, an exemplary embodiment of the invention.

As shown in FIG. 1, which illustrates, in flowchart form, an exemplary embodiment of the invention, once the process of loading the operating system starts, in step 102, the boot drivers are loaded (step 104). (Boot drivers are hardware drivers that are required for the absolute minimum hardware functionality—e.g., VGA monitor driver, keyboard driver, mouse driver, HDD driver.) In step 106, a native application is invoked, and creates a first snapshot. "A native application" is an application assembled in a particular manner, and designed to work on the zero ring of the Intel processor after the system start, just before the drivers and system services are launched. (MS Windows services are analogous to UNIX daemons.)

In step 108, the operating system loading process ends, and at this point, the rootkit can initialize itself.

In step 110, a current snapshot 2 is formed. In step 112, snapshots 1 and 2 are compared. If the comparison shows that they are identical, then, in step 114, it is possible to conclude that there is no rootkit, and the user may be so informed (if requested). Otherwise, if snapshots 1 and 2 are not the same, then, in step 116, a reboot is initiated. In step 118, a boot driver is loaded. In step 120, snapshot 1' is generated. In step 122, the rootkit is "cured." The process then proceeds to step 108, as described above.

As further shown in FIG. 1, at the moment the drivers with a service load flag (SERVICE_BOOT_START), and before the setting of the flag for launching the system services (SERVICE_SYSTEM_START), the native application generates the first snapshot of the operating system. Thus, the snapshot is generated even before the launch of the Win32 subsystem.

Also, it should be noted that the first snapshot is generated through the register key HKLM\SYSTEM\CurrentControlSet\Control\Session Manager\PendingFileRenameOperations, with the help of the native application.

This snapshot includes at least the register branches, which are critical for the launching of the drivers, register branches which are responsible for file removal and file renaming (for example, HKLM\System\CurrentControlSet\Services), driver file control sums, etc. One of ordinary skill in the art will readily appreciate that the snapshot can include additional information as well, or only a subset of the above information.

After the first snapshot of the operating system is generated, the snapshot is then preferably saved to some persistent storage medium, such as a hard disk drive, a flash driver, tape, DVD-ROM, etc. Once the operating system is loaded, the snapshot of the current state of the operating system can then be generated.

The second snapshot is formed in the same manner as the first snapshot, and contains the same data as the first snapshot—or should, in theory, if the rootkit has not infected the operating system.

Once the current snapshot is generated, it can be compared with the original snapshot. If the comparison is exact, then there is no rootkit infection, and the operating system can proceed accordingly. If the two snapshots show any difference, this indicates a possibility of rootkit infection. In that case, the rootkit can be cured, for example, by restoring the operating system from a trusted copy or image.

As an option, a log of which files have been loaded, altered and/or removed, and which registry values have changed, can be kept in the interval between the first and second snapshots. For example, the log can be implemented as follows:

[time] Explorer.EXE—create section for execute <path>\avp.exe—SUCCESS
[time] Explorer.EXE [pid]—Process Create: <path>\avp.exe [pid]—SUCCESS
[time] avp.exe [pid]—Thread Create [tid]—SUCCESS
[time] avp.exe [pid]—RegSetValue- Key: "HKCU\Software\Microsoft\Windows\Current-
Version\Run", Value "avp",
Type: REG_SZ, Data: "<path>\avp.exe"—SUCCESS The snapshot can be generated using control sums, such as checksums, hashes, or other similar one-way functions. For example, each driver is normally stored as a file, accessible by the operating system. A control sum, such as a hash value, can be generated from each such driver file. Note that in the case of using such one-way functions as hashing functions, or other cryptographic functions, the control sums are effectively encrypted, where only the user can know the key for subsequent comparison, or for snapshot generation. Table 1 below illustrates an example of a snapshot, with 4 drivers, labeled A1-A4, 4 corresponding files for the drivers, labeled FA1-FA4, and 4 corresponding control sums, labeled HA1-HA4:

| Driver Name | Driver File Name | Driver File Control Sum |
|---|---|---|
| A1 | FA1 | HA1 |
| A2 | FA2 | HA2 |
| A3 | FA3 | HA3 |
| A4 | FA4 | HA4 |

If the second snapshot has same hash values HA1-HA4, then one can conclude that the operating system has not been infected by the rootkit, and normal operation can proceed accordingly.

An alternative situation arises when the second snapshot differs from the first snapshot. This is shown in the table below:

| Driver Name | Driver File Name | Driver File Control Sum |
|---|---|---|
| A1 | FA1 | HA1 |
| A4 | FA4 | HA4' (HA4' ! = HA4) |

As may be seen from this snapshot, drivers A2 and A3 were either removed, or were hidden (or masked), and file FA4, containing the driver A4, has then altered. In this case, this is a strongly suspected case of a rootkit infection, and the operating system needs to be rebooted from a trusted image.

Snapshot 1' is illustrated below:

| Driver Name | Driver File Name | Driver File Control Sum |
|---|---|---|
| A1 | FA1 | HA1 |
| A3 | FA3 | HA3 |
| A4 | FA4 | HA4' |

By comparing the results of snapshots 1, 2 and 1', it can be concluded that driver A2 was really deleted, the file of driver A4 was modified, and driver A3 is hiding the fact of its existence in the system, and is therefore almost certainly rootkit. This driver should therefore be removed from the registry, and its corresponding file should be either deleted or placed in quarantine.

In the example above, only 4 drivers were illustrated, although it will be readily appreciated that the invention is not limited to just 4 drivers, and any number of drivers can be handled in this manner.

Figure 2A:
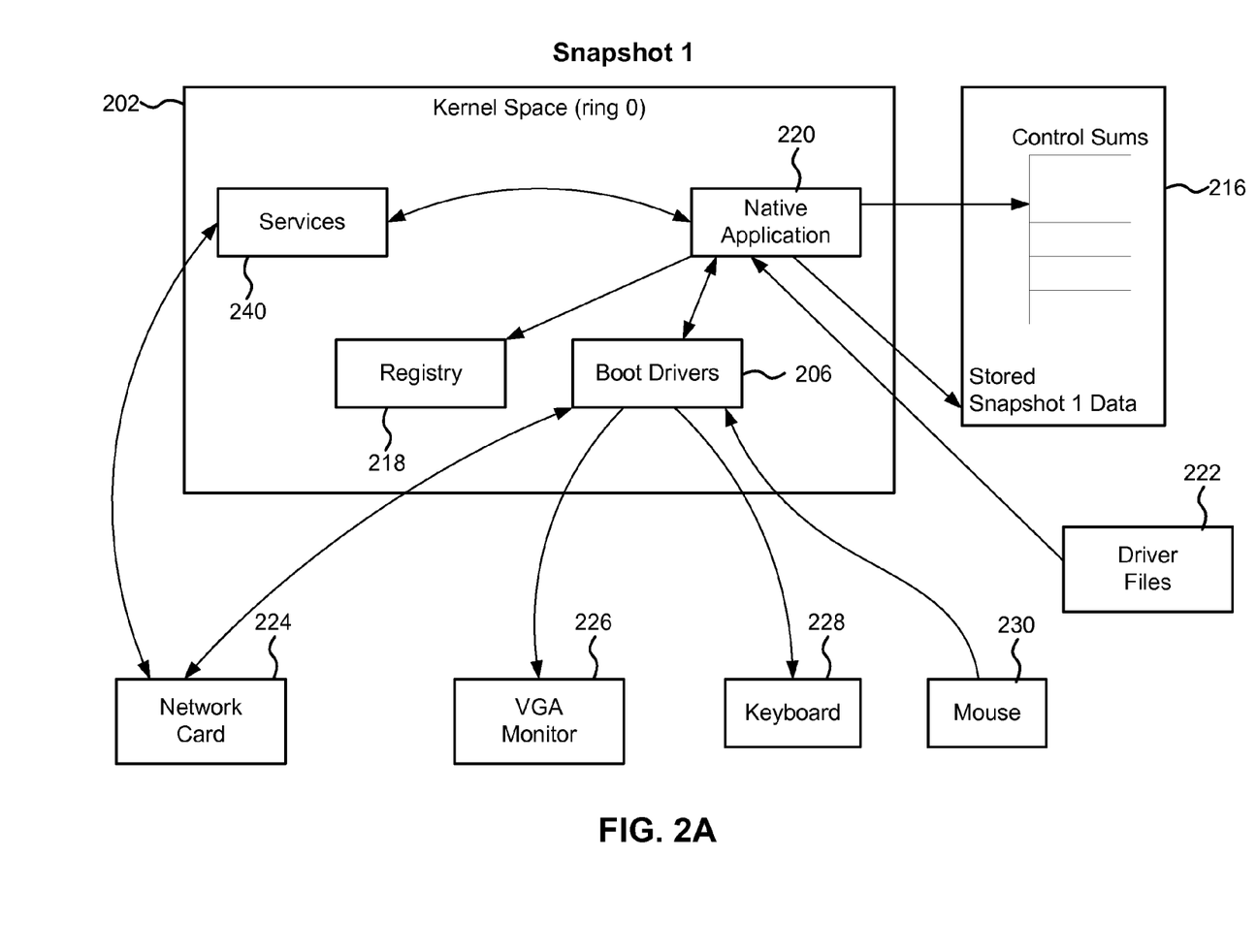
FIGS. 2A and 2B illustrate the generation and use of snapshots in block diagram form.
Figure 2B:
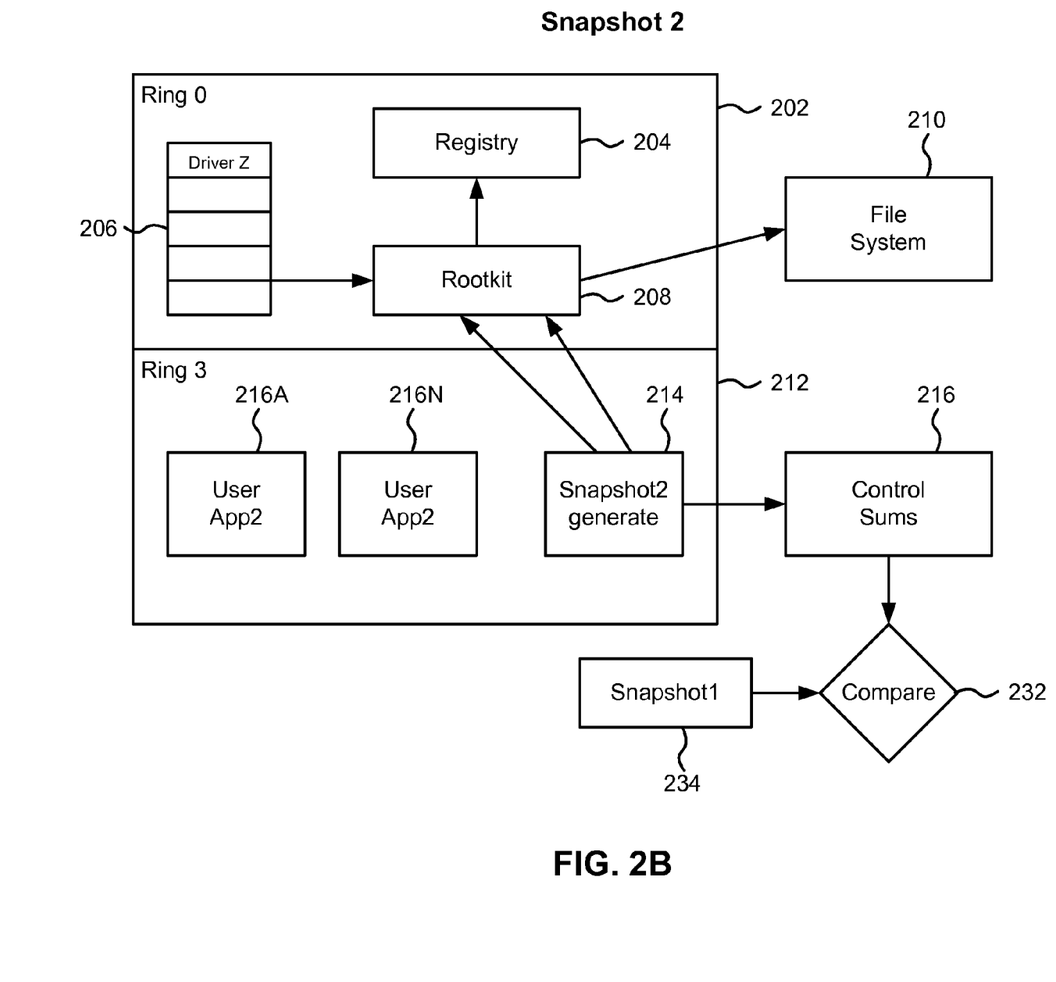

FIGS. 2A and 2B illustrate the generation and use of snapshots in block diagram form. As shown in FIG. 2A, a computer has a portion of memory, generally referred to as the kernel space, which is allocated to the operating system and its drivers and services. This is indicated by 202 in FIG. 2A. Generally, in the Intel architecture, code that runs in the kernel space normally runs in ring 0, meaning that it has the highest privilege, in the Intel ring 0-1-2-3 privilege scheme.

As further shown in FIG. 2A, the kernel space 202 hold the code for the various services 240, the registry 218, and the boot drivers 206. The native application 220, discussed above, also resides in the kernel space 202. As further shown in FIG. 2A, the boot drivers 206 are used to interface to such hardware as the network card 224, the VGA monitor 226, the keyboard 228, and the mouse 230. As further shown in FIG. 2A, driver files 222, which are usually stored on the local disk drive or some other storage media, are used by the native application to generate control sums 216. Also, registry values from the registry 218 are also used to generate the control sums 216. Collectively, these control sums represent the data of snapshot1.

FIG. 2B illustrates the situation where a rootkit 208 is present in the system. Also shown in FIG. 2B are two user applications 216A, 216N, which run in user space, or ring3 in Intel terminology. The rootkit 206, as shown in FIG. 2B, affect the registry 204, the file system 210, and possibly other aspects of the computer system. As further shown in FIG. 2B, once the second snapshot (214) is generated, and control sums are calculated, the two shapshots, snapshot1 and snapshot2 can then be compared (see 232), for example, using bitwise or bytewise comparison. The results of that comparison will then reveal whether any of the files are masked, indicating the presence of the rootkit 208.

The following is an exemplary set of files subject to the snapshot for the Win32 OS version:

Register Branches:
HKCR\exefile\shell\open\command
HKCR\exefile\shell\runas\command
HKCR\comfile\shell\open\command
HKCR\comfile\shell\runas\command
HKCR\piffile\shell\open\command
HKCR\piffile\shell\runas\command
HKCR\batfile\shell\open\command
HKCR\batfile\shell\runas\command
HKCR\htafile\shell\open\command
HKCR\htafile\shell\runas\command
HKCR\cmdfile\shell\open\command
HKCR\cmdfile\shell\runas\command
HKCR\scrfile\shell\open\command
HKCR\scrfile\shell\runas\command
HKCR\txtfile\shell\open\command
HKCR\txtfile\shell\runas\command
HKCR\regfile\shell\open\command
HKCR\regfile\shell\runas\command
HKCR\*file\shell\open\command
HKCR\*file\shell\runas\command
*\Software\Microsoft\Windows
   NT\CurrentVersion\AEDebug\Debugger
*\Software\Microsoft\Windows
   NT\CurrentVersion\Winlogon\Shell
*\Software\Microsoft\Windows
   NT\CurrentVersion\Winlogon\Userinit
*\Software\Microsoft\Windows
   NT\CurrentVersion\Windows\Run
*\Software\Microsoft\Windows*\CurrentVersion\
   Windows\Load
*\SOFTWARE\Microsoft\Windows
   NT\CurrentVersion\Winlogon\Taskman

*\SOFTWARE\Microsoft\Windows NT\CurrentVersion\Winlogon\System
*\SOFTWARE\Microsoft\Windows NT\CurrentVersion\Winlogon\Notify\*\DllName
*\Software\Microsoft\Windows*\CurrentVersion\Run*\*
HKCU\Software\Mirabilis\ICQ\Agent\Apps\*
HKLM\System\ControlSet???\Services\*\Parameters\ServiceDll
HKLM\System\ControlSet???\Services\*\ImagePath
HKLM\System\ControlSet???\Services\VXD\*\StaticVxD
HKLM\system\controlset???\control\Session Manager\BootExecute
HKLM\System\controlset???\Control\MPRServices\*\DLLName
HKLM\System\CurrentControlSet\Services\VXD\*\StaticVxD
HKLM\system\Currentcontrolset\control\Session Manager\BootExecute
HKLM\System\CurrentControlSet\Control\MPRServices\*\DLLName
HKLM\Software\Microsoft\Active Setup\Installed Components\*\StubPath
HKLM\Software\Microsoft\Windows NT\CurrentVersion\WOW\BOOT\*
HKLM\Software\Microsoft\Windows NT\CurrentVersion\Drivers\*
HKLM\Software\Microsoft\Windows NT\CurrentVersion\Drivers32\*
HKLM\Software\Microsoft\Windows NT\CurrentVersion\Windows\AppInit_DLLs
*\SOFTWARE\Microsoft\Windows\CurrentVersion\ShellServiceObjectDelayLoad\*
HKLM\SOFTWARE\Microsoft\VBA\Monitors\*\CLSID
HKCU\Control Panel\Desktop\SCRNSAVE.EXE
*\SOFTWARE\Microsoft\Windows\CurrentVersion\Explorer\SharedTaskScheduler\*
*\SOFTWARE\Microsoft\Windows\CurrentVersion\Explorer\ShellExecuteHooks\*
*\Software\Policies\Microsoft\Windows\System\Scripts\*
*\Software\Microsoft\Windows\CurrentVersion\policies\Explorer\Run\*
*\Software\Microsoft\Windows\CurrentVersion\Policies\System\Shell
HKLM\Software\Microsoft\Windows\CurrentVersion\Shell Extensions\Approved\*
*\Software\Microsoft\Command Processor\AutoRun
HKLM\Software\Microsoft\Internet Explorer\Toolbar\*
*\Software\Microsoft\Internet Explorer\MenuExt\*
HKCU\Software\Microsoft\Windows\CurrentVersion\Explorer\FileExts\.exe\*
HKCU\Software\Microsoft\Windows\CurrentVersion\Explorer\FileExts\.com\*
HKCU\Software\Microsoft\Windows\CurrentVersion\Explorer\FileExts\.bat\*
HKCU\Software\Microsoft\Windows\CurrentVersion\Explorer\FileExts\.pif\*
*\SOFTWARE\Microsoft\Windows\CurrentVersion\Explorer\Browser Helper Objects\*
HKLM\Software\Microsoft\Windows\CurrentVersion\App Paths\*\*
HKEY_LOCAL_MACHINE\SOFTWARE\Microsoft\Windows NT\CurrentVersion\Image File Execution Options\*\Debugger
*\SOFTWARE\Microsoft\Internet Explorer\Extensions\*\*
*\SOFTWARE\Microsoft\Internet Explorer\Extensions\*
HKLM\SOFTWARE\Microsoft\Code Store Database\Distribution Units\*\Contains\Files\*
HKLM\SOFTWARE\Microsoft\Code Store Database\Distribution Units\*

Control Sums are Calculated for the Following Files:
c:\autoexec.bat
%SystemDrive%\autoexec.bat
c:\config.sys
%SystemDrive%\config.sys
Winstart.bat
win.ini
system.ini
*:\autorun.inf Also, control sums can be generated for all drivers, .dll and .exe files (or, even more broadly, all the files listed in the above-identifed register branches and their alternate data storage). [PLS ADD, AS DISCUSSED]

The following is an exemplary set of files subject to the snapshot for the Win64 OS version:

The Following Register Branches are Monitored:
HKCU\Software\Microsoft\Windows\CurrentVersion\Run
HKCU\Software\Microsoft\Windows\CurrentVersion\Policies\Explorer\Run
HKLM\Software\Microsoft\Windows\CurrentVersion\Run
HKLM\Software\Microsoft\Windows\CurrentVersion\Policies\Explorer\Run
HKLM\Software\Wow6432Node\Microsoft\Windows\CurrentVersion\Run
HKCU\Software\Classes\VirtualStore\MACHINE\Software\Microsoft\Windows\CurrentVersion\Run
HKCU\Software\Classes\VirtualStore\MACHINE\Software\Microsoft\Windows\CurrentVersion\Policies\Explorer\Run
HKCU\Software\Classes\VirtualStore\MACHINE\Software\Wow6432Node\Microsoft\Windows\CurrentVersion\Run Run Once—Related Branches:
HKCU\Software\Microsoft\Windows\CurrentVersion\RunOnce
HKCU\Software\Microsoft\Windows\CurrentVersion\RunOnceEx
HKLM\Software\Microsoft\Windows\CurrentVersion\RunOnce
HKLM\Software\Microsoft\Windows\CurrentVersion\RunOnceEx
HKLM\Software\Wow6432Node\Microsoft\Windows\CurrentVersion\RunOnce
HKLM\Software\Wow6432Node\Microsoft\Windows\CurrentVersion\RunOnceEx
HKCU\Software\Classes\VirtualStore\MACHINE\Software\Microsoft\Windows\CurrentVersion\RunOnce
HKCU\Software\Classes\VirtualStore\MACHINE\Software\Microsoft\Windows\CurrentVersion\RunOnceEx
HKCU\Software\Classes\VirtualStore\MACHINE\Software\Wow6432Node\Microsoft\Windows\CurrentVersion\RunOnce
HKCU\Software\Classes\VirtualStore\MACHINE\Software\Wow6432Node\Microsoft\Windows\CurrentVersion\RunOnceEx CLSIDs—Related Branches:
HKCU\Software\Classes\CLSID
HKLM\Software\Classes\CLSID
HKCU\Software\Classes\Wow6432Node\CLSID
HKLM\Software\Classes\Wow6432Node\CLSID
HKCU\Software\Classes\VirtualStore\MACHINE\Software\Classes\CLSID
HKCU\Software\Classes\VirtualStore\MACHINE\Software\Classes\Wow6432Node\CLSID Search—Related Branches:
HKCU\SOFTWARE\Microsoft\Internet Explorer\Search
HKLM\SOFTWARE\Microsoft\Internet Explorer\Search
HKLM\Software\Wow6432Node\Microsoft\Internet Explorer\Search
HKCU\Software\Classes\VirtualStore\MACHINE\SOFTWARE\Microsoft\Internet Explorer\Search
HKCU\Software\Classes\VirtualStore\MACHINE\Software\Wow6432Node\Microsoft\Internet Explorer\Search
HKCU\SOFTWARE\Microsoft\Internet Explorer\SearchUrl
HKLM\SOFTWARE\Microsoft\Internet Explorer\SearchUrl
HKLM\SOFTWARE\Wow6432Node\Microsoft\Internet Explorer\SearchUrl
HKCU\Software\Classes\VirtualStore\MACHINE\SOFTWARE\Microsoft\Internet Explorer\SearchUrl
HKCU\Software\Classes\VirtualStore\MACHINE\SOFTWARE\Wow6432Node\Microsoft\Internet Explorer\SearchUrl ActiveX Load and Installation—Related Branches:
HKLM\Software\Microsoft\Code Store Database\Distribution Units
HKCU\Software\Classes\VirtualStore\MACHINE\Software\Microsoft\Code Store Database\Distribution Units
HKLM\Software\Wow6432Node\Microsoft\Code Store Database\Distribution Units
HKCU\Software\Classes\VirtualStore\MACHINE\Software\Wow6432Node\Microsoft\Code Store Database\Distribution Units Drivers:
HKLM\System\CurrentControlSet\Services Context Menu Handlers—Related Branches:
HKCU\Software\Classes\*\shellex\ContextMenuHandlers
HKLM\Software\Classes\*\shellex\ContextMenuHandlers
HKCU\Software\Classes\Wow6432Node\*\shellex\ContextMenuHandlers
HKLM\Software\Classes\Wow6432Node\*\shellex\ContextMenuHandlers
HKCU\Software\Classes\VirtualStore\MACHINE\Software\Classes\*\shellex\ContextMenuHandlers
HKCU\Software\Classes\VirtualStore\MACHINE\Software\Classes\Wow6432Node\*\shellex\ContextMenuHandlers Browser Helper Object:
HKCU\Software\Microsoft\Windows\CurrentVersion\Explorer\Browser Helper Objects
HKLM\Software\Microsoft\Windows\CurrentVersion\Explorer\Browser Helper Objects
HKCU\Software\Classes\VirtualStore\MACHINE\Software\Microsoft\Windows\CurrentVersion\Explorer\Browser Helper Objects
HKLM\Software\Wow6432Node\Microsoft\Windows\CurrentVersion\Explorer\Browser Helper Objects
HKCU\Software\Classes\VirtualStore\MACHINE\Software\Wow6432Node\Microsoft\Windows\CurrentVersion\Explorer\Browser Helper Objects Shell Execute Hooks:
HKLM\Software\Microsoft\Windows\CurrentVersion\Explorer\ShellExecuteHooks
HKLM\Software\Wow6432Node\Microsoft\Windows\CurrentVersion\Explorer\ShellExecuteHooks Name Server Protection:
HKLM\System\CurrentControlSet\Services\Tcpip\Parameters Screen Saver:
HKCU\Control Panel\Desktop Lsp:
HKLM\System\CurrentControlSet\Services\WinSock2\Parameters\Protocol_Catalog9\Catalog_Entries
HKLM\System\CurrentControlSet\Services\WinSock2\Parameters\NameSpace_Catalog5\Catalog_Entries Ini File Mapping:
HKLM\Software\Microsoft\Windows NT\CurrentVersion\IniFileMapping\system.ini\boot
HKLM\Software\Microsoft\Windows NT\CurrentVersion\IniFileMapping\win.ini
HKLM\Software\Wow6432Node\Microsoft\Windows NT\CurrentVersion\IniFileMapping\system.ini\boot
HKLM\Software\Wow6432Node\Microsoft\Windows NT\CurrentVersion\IniFileMapping\win.ini
HKCU\Software\Classes\VirtualStore\MACHINE\Software\Microsoft\Windows NT\CurrentVersion\IniFileMapping\system.ini\boot
HKCU\Software\Classes\VirtualStore\MACHINE\Software\Microsoft\Windows NT\CurrentVersion\IniFileMapping\win.ini
HKCU\Software\Classes\VirtualStore\MACHINE\Software\Wow6432Node\Microsoft\Windows NT\CurrentVersion\IniFileMapping\system.ini\boot
HKCU\Software\Classes\VirtualStore\MACHINE\Software\Wow6432Node\Microsoft\Windows NT\CurrentVersion\IniFileMapping\win.ini IE About:
HKCU\SOFTWARE\Microsoft\Internet Explorer\AboutURLs
HKLM\SOFTWARE\Microsoft\Internet Explorer\AboutURLs
HKLM\SOFTWARE\Wow6432Node\Microsoft\Internet Explorer\AboutURLs
HKCU\Software\Classes\VirtualStore\MACHINE\SOFTWARE\Microsoft\Internet Explorer\AboutURLs
HKCU\Software\Classes\VirtualStore\MACHINE\SOFTWARE\Wow6432Node\Microsoft\Internet Explorer\AboutURLs IE Explorer Bars:
HKCU\Software\Microsoft\Internet Explorer\Explorer Bars
HKLM\Software\Microsoft\Internet Explorer\Explorer Bars
HKLM\Software\Wow6432Node\Microsoft\Internet Explorer\Explorer Bars
HKCU\Software\Classes\VirtualStore\MACHINE\Software\Microsoft\Internet Explorer\Explorer Bars
HKCU\Software\Classes\VirtualStore\MACHINE\Software\Wow6432Node\Microsoft\Internet Explorer\Explorer Bars Restrict Run:
HKCU\Software\Microsoft\Windows\CurrentVersion\Policies\Explorer\RestrictRun Shell Open Command:
HKCU\Software\Classes\batfile\shell\open\command
HKCU\Software\Classes\batfile\shell\runas\command
HKCU\Software\Classes\comfile\shell\open\command
HKCU\Software\Classes\exefile\shell\open\command
HKCU\Software\Classes\ftp\shell\open\command
HKCU\Software\Classes\htafile\shell\open\command
HKCU\Software\Classes\htmlfile\shell\open\command
HKCU\Software\Classes\http\shell\open\command
HKCU\Software\Classes\https\shell\open\command
HKCU\Software\Classes\mailto\shell\open\command
HKCU\Software\Classes\mp3file\shell\open\command
HKCU\Software\Classes\mpegfile\shell\open\command
HKCU\Software\Classes\piffile\shell\open\command HKCU\Software\Classes\txtfile\shell\open\command
HKCU\Software\Classes\cmdfile\shell\open\command
HKCU\Software\Classes\regfile\shell\open\command
HKCU\Software\Classes\scrfile\shell\open\command
HKCU\Software\Classes\vbsfile\shell\open\command
HKLM\Software\Classes\batfile\shell\open\command
HKLM\Software\Classes\batfile\shell\runas\command
HKLM\Software\Classes\comfile\shell\open\command
HKLM\Software\Classes\exefile\shell\open\command
HKLM\Software\Classes\ftp\shell\open\command
HKLM\Software\Classes\htafile\shell\open\command
HKLM\Software\Classes\htmlfile\shell\open\command
HKLM\Software\Classes\http\shell\open\command
HKLM\Software\Classes\https\shell\open\command
HKLM\Software\Classes\mailto\shell\open\command
HKLM\Software\Classes\mp3file\shell\open\command
HKLM\Software\Classes\mpegfile\shell\open\command
HKLM\Software\Classes\piffile\shell\open\command
HKLM\Software\Classes\txtfile\shell\open\command
HKLM\Software\Classes\cmdfile\shell\open\command
HKLM\Software\Classes\regfile\shell\open\command
HKLM\Software\Classes\scrfile\shell\open\command
HKLM\Software\Classes\vbsfile\shell\open\command
HKCU\Software\Classes\Wow6432Node\batfile\shell\open\command
HKCU\Software\Classes\Wow6432Node\batfile\shell\runas\command
HKCU\Software\Classes\Wow6432Node\comfile\shell\open\command
HKCU\Software\Classes\Wow6432Node\exefile\shell\open\command
HKCU\Software\Classes\Wow6432Node\ftp\shell\open\command
HKCU\Software\Classes\Wow6432Node\htafile\shell\open\command
HKCU\Software\Classes\Wow6432Node\htmlfile\shell\open\command
HKCU\Software\Classes\Wow6432Node\http\shell\open\command
HKCU\Software\Classes\Wow6432Node\https\shell\open\command
HKCU\Software\Classes\Wow6432Node\mailto\shell\open\command
HKCU\Software\Classes\Wow6432Node\mp3file\shell\open\command
HKCU\Software\Classes\Wow6432Node\mpegfile\shell\open\command
HKCU\Software\Classes\Wow6432Node\piffile\shell\open\command
HKCU\Software\Classes\Wow6432Node\txtfile\shell\open\command
HKCU\Software\Classes\Wow6432Node\cmdfile\shell\open\command
HKCU\Software\Classes\Wow6432Node\regfile\shell\open\command
HKCU\Software\Classes\Wow6432Node\scrfile\shell\open\command
HKCU\Software\Classes\Wow6432Node\vbsfile\shell\open\command
HKLM\Software\Classes\Wow6432Node\batfile\shell\open\command
HKLM\Software\Classes\Wow6432Node\batfile\shell\runas\command
HKLM\Software\Classes\Wow6432Node\comfile\shell\open\command
HKLM\Software\Classes\Wow6432Node\exefile\shell\open\command
HKLM\Software\Classes\Wow6432Node\ftp\shell\open\command
HKLM\Software\Classes\Wow6432Node\htafile\shell\open\command
HKLM\Software\Classes\Wow6432Node\htmlfile\shell\open\command
HKLM\Software\Classes\Wow6432Node\http\shell\open\command
HKLM\Software\Classes\Wow6432Node\https\shell\open\command
HKLM\Software\Classes\Wow6432Node\mailto\shell\open\command
HKLM\Software\Classes\Wow6432Node\mp3file\shell\open\command
HKLM\Software\Classes\Wow6432Node\mpegfile\shell\open\command
HKLM\Software\Classes\Wow6432Node\piffile\shell\open\command
HKLM\Software\Classes\Wow6432Node\txtfile\shell\open\command
HKLM\Software\Classes\Wow6432Node\cmdfile\shell\open\command
HKLM\Software\Classes\Wow6432Node\regfile\shell\open\command
HKLM\Software\Classes\Wow6432Node\scrfile\shell\open\command
HKLM\Software\Classes\Wow6432Node\vbsfile\shell\open\command
HKCU\Software\Classes\VirtualStore\MACHINE\Software\Classes\batfile\shell\open\command
HKCU\Software\Classes\VirtualStore\MACHINE\Software\Classes\batfile\shell\runas\command
HKCU\Software\Classes\VirtualStore\MACHINE\Software\Classes\comfile\shell\open\command
HKCU\Software\Classes\VirtualStore\MACHINE\Software\Classes\exefile\shell\open\command
HKCU\Software\Classes\VirtualStore\MACHINE\Software\Classes\ftp\shell\open\command
HKCU\Software\Classes\VirtualStore\MACHINE\Software\Classes\htafile\shell\open\command
HKCU\Software\Classes\VirtualStore\MACHINE\Software\Classes\htmlfile\shell\open\command
HKCU\Software\Classes\VirtualStore\MACHINE\Software\Classes\http\shell\open\command
HKCU\Software\Classes\VirtualStore\MACHINE\Software\Classes\https\shell\open\command
HKCU\Software\Classes\VirtualStore\MACHINE\Software\Classes\mailto\shell\open\command
HKCU\Software\Classes\VirtualStore\MACHINE\Software\Classes\mp3file\shell\open\command
HKCU\Software\Classes\VirtualStore\MACHINE\Software\Classes\mpegfile\shell\open\command
HKCU\Software\Classes\VirtualStore\MACHINE\Software\Classes\piffile\shell\open\command
HKCU\Software\Classes\VirtualStore\MACHINE\Software\Classes\txtfile\shell\open\command
HKCU\Software\Classes\VirtualStore\MACHINE\Software\Classes\cmdfile\shell\open\command
HKCU\Software\Classes\VirtualStore\MACHINE\Software\Classes\regfile\shell\open\command
HKCU\Software\Classes\VirtualStore\MACHINE\Software\Classes\scrfile\shell\open\command
HKCU\Software\Classes\VirtualStore\MACHINE\Software\Classes\vbsfile\shell\open\command
HKCU\Software\Classes\VirtualStore\MACHINE\Software\Classes\Wow6432Node\batfile\shell\open\command HKCU\Software\Classes\VirtualStore\MACHINE\Software\Classes\Wow6432Node\batfile\shell\runas\command
HKCU\Software\Classes\VirtualStore\MACHINE\Software\Classes\Wow6432Node\comfile\shell\open\command
HKCU\Software\Classes\VirtualStore\MACHINE\Software\Classes\Wow6432Node\exefile\shell\open\command
HKCU\Software\Classes\VirtualStore\MACHINE\Software\Classes\Wow6432Node\ftp\shell\open\command
HKCU\Software\Classes\VirtualStore\MACHINE\Software\Classes\Wow6432Node\htafile\shell\open\command
HKCU\Software\Classes\VirtualStore\MACHINE\Software\Classes\Wow6432Node\htmlfile\shell\open\command
HKCU\Software\Classes\VirtualStore\MACHINE\Software\Classes\Wow6432Node\http\shell\open\command
HKCU\Software\Classes\VirtualStore\MACHINE\Software\Classes\Wow6432Node\https\shell\open\command
HKCU\Software\Classes\VirtualStore\MACHINE\Software\Classes\Wow6432Node\mailto\shell\open\command
HKCU\Software\Classes\VirtualStore\MACHINE\Software\Classes\Wow6432Node\mp3file\shell\open\command
HKCU\Software\Classes\VirtualStore\MACHINE\Software\Classes\Wow6432Node\mpegfile\shell\open\command
HKCU\Software\Classes\VirtualStore\MACHINE\Software\Classes\Wow6432Node\piffile\shell\open\command
HKCU\Software\Classes\VirtualStore\MACHINE\Software\Classes\Wow6432Node\txtfile\shell\open\command
HKCU\Software\Classes\VirtualStore\MACHINE\Software\Classes\Wow6432Node\cmdfile\shell\open\command
HKCU\Software\Classes\VirtualStore\MACHINE\Software\Classes\Wow6432Node\regfile\shell\open\command
HKCU\Software\Classes\VirtualStore\MACHINE\Software\Classes\Wow6432Node\scrfile\shell\open\command
HKCU\Software\Classes\VirtualStore\MACHINE\Software\Classes\Wow6432Node\vbsfile\shell\open\command
User Shell Folders:
HKCU\Software\Microsoft\Windows\CurrentVersion\Explorer\User Shell Folders
HKLM\Software\Microsoft\Windows\CurrentVersion\Explorer\User Shell Folders
HKLM\Software\Wow6432Node\Microsoft\Windows\CurrentVersion\Explorer\User Shell Folders
HKCU\Software\Classes\VirtualStore\MACHINE\Software\Microsoft\Windows\CurrentVersion\Explorer\User Shell Folders
HKCU\Software\Classes\VirtualStore\MACHINE\Software\Wow6432Node\Microsoft\Windows\CurrentVersion\Explorer\User Shell Folders
HKLM\SOFTWARE\Wow6432Node\MICROSOFT\Windows\CurrentVersion\Explorer\User Shell Folders
IE Main:
HKCU\SOFTWARE\Microsoft\Internet Explorer\Main
HKLM\SOFTWARE\Microsoft\Internet Explorer\Main
HKLM\Software\Wow6432Node\Microsoft\Internet Explorer\Main
HKCU\Software\Classes\VirtualStore\MACHINE\SOFTWARE\Microsoft\Internet Explorer\Main
HKCU\Software\Classes\VirtualStore\MACHINE\Software\Wow6432Node\Microsoft\Internet Explorer\Main
IE Extensions:
HKCU\Software\Microsoft\Internet Explorer\Extensions
HKLM\Software\Microsoft\Internet Explorer\Extensions
HKLM\Software\Wow6432Node\Microsoft\Internet Explorer\Extensions
HKCU\Software\Classes\VirtualStore\MACHINE\Software\Microsoft\Internet Explorer\Extensions
HKCU\Software\Classes\VirtualStore\MACHINE\Software\Wow6432Node\Microsoft\Internet Explorer\Extensions
IE Plugin:
HKLM\SOFTWARE\Microsoft\Internet Explorer\Plugins\Extension
HKLM\SOFTWARE\Wow6432Node\Microsoft\Internet Explorer\Plugins\Extension
HKCU\Software\Classes\VirtualStore\MACHINE\SOFTWARE\Microsoft\Internet Explorer\Plugins\Extension
HKCU\Software\Classes\VirtualStore\MACHINE\SOFTWARE\Wow6432Node\Microsoft\Internet Explorer\Plugins\Extension
IE Menu Extension:
HKCU\Software\Microsoft\Internet Explorer\MenuExt
IE Toolbar:
HKCU\Software\Microsoft\Internet Explorer\Toolbar
HKLM\Software\Microsoft\Internet Explorer\Toolbar
HKLM\Software\Wow6432Node\Microsoft\Internet Explorer\Toolbar
HKCU\Software\Classes\VirtualStore\MACHINE\Software\Microsoft\Internet Explorer\Toolbar
HKCU\Software\Classes\VirtualStore\MACHINE\Software\Wow6432Node\Microsoft\Internet Explorer\Toolbar
IE Shell Browser:
HKCU\Software\Microsoft\Internet Explorer\Toolbar\ShellBrowser
IE Url Search Hooks:
HKCU\Software\Microsoft\Internet Explorer\UrlSearchHooks
HKLM\Software\Microsoft\Internet Explorer\UrlSearchHooks
HKLM\Software\Wow6432Node\Microsoft\Internet Explorer\UrlSearchHooks
HKCU\Software\Classes\VirtualStore\MACHINE\Software\Microsoft\Internet Explorer\UrlSearchHooks
HKCU\Software\Classes\VirtualStore\MACHINE\Software\Wow6432Node\Microsoft\Internet Explorer\UrlSearchHooks
IE Web Browser:
HKCU\Software\Microsoft\Internet Explorer\Toolbar\WebBrowser
Safe Boot:
HKLM\System\CurrentControlSet\Control\SafeBoot\Minimal
HKLM\System\CurrentControlSet\Control\SafeBoot\Network
Autorun:
HKCU\Software\Microsoft\Command Processor
HKLM\Software\Microsoft\Command Processor
HKCU\Software\Classes\VirtualStore\MACHINE\Software\Microsoft\Command Processor
HKLM\Software\Wow6432Node\Microsoft\Command Processor
HKCU\Software\Classes\VirtualStore\MACHINE\Software\Wow6432Node\Microsoft\Command Processor
Control Sums are Calculated for the Following Files:
%SystemRoot%\System32\drivers\*.sys
%SYSTEMROOT%\System32\Tasks (Task Scheduler)

%ProgramData%\Microsoft\Windows\Start Menu\Programs\Startup

%USERPROFILE%\AppData\Roaming\Microsoft\Windows\Start Menu\Programs\Startup (Startup Folder)

c:\autoexec.bat

%SystemDrive%\autoexec.bat c:\config.sys

%SystemDrive%\config.sys

Winstart.bat win.ini system.ini

*:\autorun.inf also, control sums can be generated for all drivers, .dll and .exe files (or, even more broadly, all the files listed in the above-identifed register branches and their alternate data storage)

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for detecting a rootkit on a computer, the method comprising:

starting an operating system on the computer;

when the operating system is in a trusted state upon a reboot of the computer, after loading of the boot drivers but before loading of non-boot drivers, generating a first snapshot for files of the operating system and for a registry;

storing the first snapshot;

after the loading of the non-boot drivers, generating a second snapshot for the files and for the registry;

comparing the second snapshot with the first snapshot; and upon detecting, in the comparing step, one of a masked file and a masked registry branch, informing a user of possible rootkit presence on the computer, wherein the first and the second snapshots are generated by sector-by-sector copying of an entire file system and registry.

2. The method of claim 1, wherein the snapshots are generated by a native application running in ring 0.

3. The method of claim 1, wherein the files include system services.

4. The method of claim 3, wherein the system services are identified by a SERVICE_SYSTEM_START flag.

5. The method of claim 1, wherein the snapshot is generated based on control sums for the files.

6. The method of claim 1, further comprising maintaining, between the steps of generating the first snapshot and generating the second snapshot, a log of which files have been loaded and which registry values have changed, and wherein the comparing step is also performed based on the log.

7. The method of claim 1, wherein the operating system is a WINDOWS operating system.

8. The method of claim 1, wherein the WINDOWS operating system is a 64 bit operating system.

9. The method of claim 1, wherein the WINDOWS operating system is a 32 bit operating system.

10. The method of claim 1, wherein the boot drivers are identified by a SERVICE_BOOT_START flag.

11. The method of claim 1, wherein the snapshots are generated using a native application launched by utilizing a HKLM\SYSTEM\CurrentControlSet\Control\Session Manager\BootExecute key.

12. The method of claim 1, wherein the snapshots are generated by a native application on ring 0.

13. The method of claim 1, further comprising, upon detecting the rootkit, rebooting the operating system from a trusted image.

14. A system for detecting a rootkit on a computer having an operating system, the system comprising:

a native application located on a non-transitory computer useable medium which, when the operating system is in a trusted state upon a reboot of the computer, after loading of the boot drivers but before loading of non-boot drivers, generates a first snapshot for files of the operating system and for a registry;

the first snapshot being stored on a persistent storage medium of the computer;

a second snapshot for the selected files and for the registry generated by the native application after the loading of the non-boot drivers;

means for comparing the second snapshot with the first snapshot; and upon detecting, in the comparing step, one of a masked file and a masked registry branch, means for informing a user of possible rootkit presence on the computer, wherein the first and the second snapshots are generated by sector-by-sector copying of an entire file system and registry.

15. The system of claim 14, wherein the native application is running in ring 0.

16. The system of claim 14, wherein the files include system services.

17. The method of claim 16, wherein the system services are identified by a SERVICE_SYSTEM_START flag.

18. The system of claim 14, wherein the operating system is a WINDOWS operating system.

19. The system of claim 14, wherein the WINDOWS operating system is a 64 bit operating system.

20. The system of claim 14, wherein the WINDOWS operating system is a 32 bit operating system.

21. The system of claim 14, wherein the boot drivers are identified by a SERVICE_BOOT_START flag.

22. The system of claim 14, wherein the snapshots are generated using a native application launched by utilizing a HKLM\SYSTEM\CurrentControlSet\Control\Session Manager\BootExecute key.

23. A non-transitory computer readable medium having computer program logic stored thereon for executing on a one processor for detecting a rootkit, the computer program logic comprising:

computer program code starting an operating system on the computer;

when the operating system is in a trusted state upon a reboot of the computer, after loading of the boot drivers but before loading of non-boot drivers, computer program code generating a first snapshot for files of the operating system and for a registry;

computer program code storing the first snapshot;

after the loading of the non-boot drivers, computer program code generating a second snapshot for the files and for the registry;

computer program code comparing the second snapshot with the first snapshot; and upon detecting, in the comparing step, one of a masked file and a masked registry branch, computer program code informing a user of possible rootkit presence on the computer;

wherein the first and the second snapshots are generated by copying of an entire file system and registry sector-by-sector.

* * * * *